United States Patent
Rodman et al.

(10) Patent No.: US 7,339,605 B2
(45) Date of Patent: Mar. 4, 2008

(54) CONFERENCE LINK BETWEEN A SPEAKERPHONE AND A VIDEO CONFERENCE UNIT

(75) Inventors: Jeffrey Rodman, San Francisco, CA (US); David Drell, Austin, TX (US); Rick A. Vander Kam, San Jose, CA (US); Martin G. Sexton, Round Rock, TX (US); Don Binford, Cedar Park, TX (US); Alain Nimri, Austin, TX (US); Jeff Ratcliff, Austin, TX (US); Carolyn Kilday, Austin, TX (US); Michael J. Hess, Cedar Park, TX (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 10/897,318

(22) Filed: Jul. 21, 2004

(65) Prior Publication Data

US 2005/0231586 A1    Oct. 20, 2005

Related U.S. Application Data

(60) Provisional application No. 60/562,782, filed on Apr. 16, 2004.

(51) Int. Cl.
*H04N 7/14* (2006.01)
(52) U.S. Cl. .............................. 348/14.07; 348/14.04; 379/202.01
(58) Field of Classification Search .. 348/14.01–14.09, 348/14.1, 14.11, 14.12, 14.13; 379/202.01; 270/260, 261
See application file for complete search history.

(56) References Cited

U.S. PATENT DOCUMENTS 5,914,940 A * 6/1999 Fukuoka et al. ............ 370/263
5,999,207 A * 12/1999 Rodriguez et al. ........ 348/14.03
6,134,223 A * 10/2000 Burke et al. ................ 370/265
6,208,372 B1 * 3/2001 Barraclough ............. 348/14.16

(Continued)

FOREIGN PATENT DOCUMENTS

JP        408125738 A   *  5/1996
JP        10-042264     *  2/1998

(Continued)

OTHER PUBLICATIONS

Ojala et al. ; Video Conference Eqipment; May 7, 1998; WO 98/19458.*

(Continued)

*Primary Examiner*—Melur Ramakrishnaiah
(74) *Attorney, Agent, or Firm*—Wong, Cabello, Lutsch, Rutherford & Brucculeri, LLP (57) ABSTRACT

A conference link between devices in teleconference system at one site is disclosed. The linked devices include video conference units, speakerphones or stand-alone loudspeakers. Audio data can be transmitted through the conference link between devices. Audio data processing can be performed in either a video conference unit or a speakerphone. The microphones and loudspeakers in the video conference unit may be eliminated. The microphones and loudspeakers in the speakerphone are used. Other data, for example directories of dialing information, may also be transmitted through the conference link and the data processing may be allocated among processors in devices connected by conference links. The conference link may be wired or wireless, analog or digital. The devices may be linked by conference link in parallel or series. A dialing program can adapt the dialing stream with the locations of the near end site and the dialed far end site. The dialing program can automatically select a mutually supported network or protocol to establish a connection between two sites.

56 Claims, 8 Drawing Sheets

U.S. PATENT DOCUMENTS

| | | | |
|---|---|---|---|
| 6,580,789 B1 * | 6/2003 | Simpson et al. | 379/114.02 |
| 6,812,955 B2 * | 11/2004 | Takaki et al. | 348/14.08 |
| 2003/0048353 A1 * | 3/2003 | Kenoyer et al. | 348/14.12 |
| 2004/0012669 A1 * | 1/2004 | Drell et al. | 348/14.08 |

OTHER PUBLICATIONS

User's Guide Administrator's Guide, SoundStation® VTX 1000 Operation Manual, © 2003 Polycom, Inc.

Quick Installation Guide, Vortex®—SoundStation VTX 1000™, ® 2004, Polycom,.

J. Rodman, Polycom®, White Paper—"*The Power of Shared Resources: Conference Room Integration in the VTX/VSX Environment*", Jun. 2, 2004, pp. 1-6.

J. Rodman, Polycom®, White Paper—"The Distributed Dawn: the Emergence of Versatile Performance in the Conferencing Environment", Jun. 2, 2004, pp. 1-7.

\* cited by examiner

CONFERENCE LINK BETWEEN A SPEAKERPHONE AND A VIDEO CONFERENCE UNIT

CROSS-REFERENCE TO RELATED APPLICATIONS

The current invention is related to a provisional patent application: "A Speakerphone with a Cellular Phone Connection," by Jeff Rodman and Greg Goldfarb, Ser. No. 60/562,782, filed on Apr. 16, 2004 assigned to the same assignee.

This patent application is related to another patent application by Jed Wilson, Kate Nogarede and Greg Rousch, assigned to the same assignee, titled "Method and Apparatus for Videoconference Interaction with Bluetooth-enabled Cellular Telephone."

BACKGROUND OF THE INVENTION

1. Field of the Invention

This invention relates to conference equipment including a video conference unit and a speakerphone, more specifically to enhance and expand the features and functions of a combination of existing and future videoconference units and speakerphones.

2. Description of the Related Art

Teleconferencing has long been an essential tool for communication in business, government and educational institutions. There are many types of teleconferencing equipment based on many characterizations. One type of teleconferencing unit is a video conference unit, which transmits real-time video images as well as real-time audio signals. A video conferencing unit typically comprises a video processing component and an audio processing component. The video processing component may include a camera to pick up live images of conference participants and a video display for showing real-time video images of conference participants or images of documents. The audio portion of a video conferencing unit typically includes one or more microphones to pick up voice signals of conference participants, and loudspeakers to reproduce voices of the participants at the far end. There are many ways to connect video conferencing units. At the low end the link may be an analog plain old telephone service (POTS) line. It may be a digital service line such as an integrated service digital network (ISDN) line or a digital interface to PBX which may use a T1 or PRI line. More recently video conference units and speakerphones may be linked by digital networks using the Internet Protocol.

Video signals in a video conferencing unit are typically very different compared to an audio signal. Video signals are more complicated and bandwidth demanding than audio signals.

Another type of teleconference unit is a speakerphone, which is typically a speakerphone that includes at least a loudspeaker and a microphone. Similar to a video conference unit, a speakerphone may also have various connections to another speakerphone. The connection may be an analog POTS line, a digital service line such as an ISDN line or an IP connection.

Although video conferencing units and speakerphones have many overlapping features and functionalities, they do not usually work very well with each other. Typically, in a business or other entities, there is a video conferencing unit and a speakerphone in the same conference room. When a video conference is desired or required, the video conferencing unit is used. If only an audio conferencing is needed or available, the speakerphone is used.

As indicated above, the video conference unit and speakerphone have many features and functions overlapping. As a consequence, there is duplicate equipment for each conference unit. For example, there are microphones for the video conference unit and there are microphones for the speakerphone. There are both loudspeakers for the video conferencing unit and for the speakerphone. There are also wires connecting all these pieces. It is desirable to reduce the redundant equipment and un-clutter a typical conference room. It is desirable to have the video conference unit and the speakerphones share common components or to expand the capability and functions with redundant components.

The sound quality and features in a good speakerphone are typically better than the sound quality of the audio component in a video conference unit. The control on a speakerphone is simpler and easier to work with than a videoconference unit. It is desirable to upgrade and extend the sound quality of a video conference unit using new or existing speakerphones.

It is desirable to have a method and an apparatus with improved teleconferencing capabilities.

BRIEF SUMMARY OF THE INVENTION

The present invention uses a conference link between a video conferencing unit and a speakerphone. With this link, audio signals may be transmitted between the video conferencing unit and the speakerphone. The connected video conferencing unit and the speakerphone can work as a single unit to take advantage of the components within the two units. In one embodiment, the redundant equipment in the video conferencing unit such as loudspeakers and microphones can be eliminated from a typical conference room. In another embodiment, all audio signal processing is performed by one of the audio signal processors in either the video conference unit or the speakerphone such that the best audio processing algorithm can be used. The conference link can connect multiple video conference units with multiple speakerphones in serial or parallel. In systems with multiple video conference units or speakerphones, the audio processing may be allocated in one or more processors, either in a video conference unit or a speakerphone. The conference link may be an analog link or a digital link, wired or wireless. Similarly, other data may also be transmitted through the conference link. Other data processing may be allocated to one or more processors. In addition to sharing microphones and loudspeakers, the speakerphone and the video conference unit may also share directories in each device. A dialing program can adapt the dialing stream with the locations of the near end and the dialed far end. The dialing program can automatically select a mutually supported network or protocol to establish a connection between two sites.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 1:
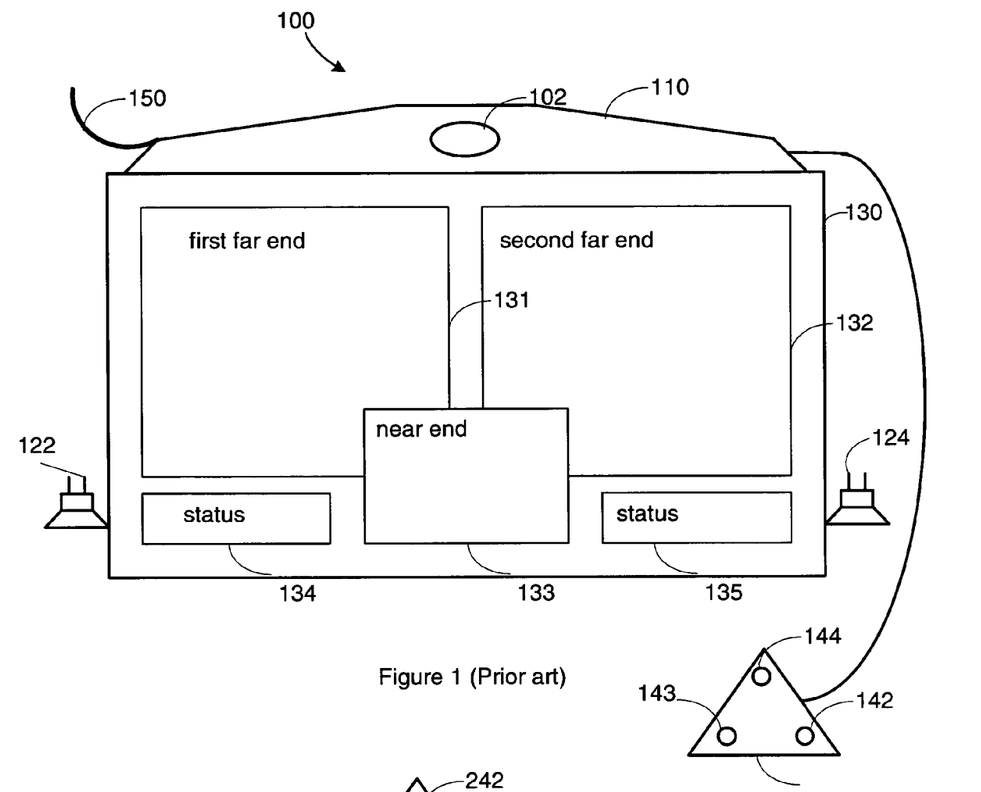
FIG. 1 depicts a typical video conferencing unit in prior art.
Figure 4:
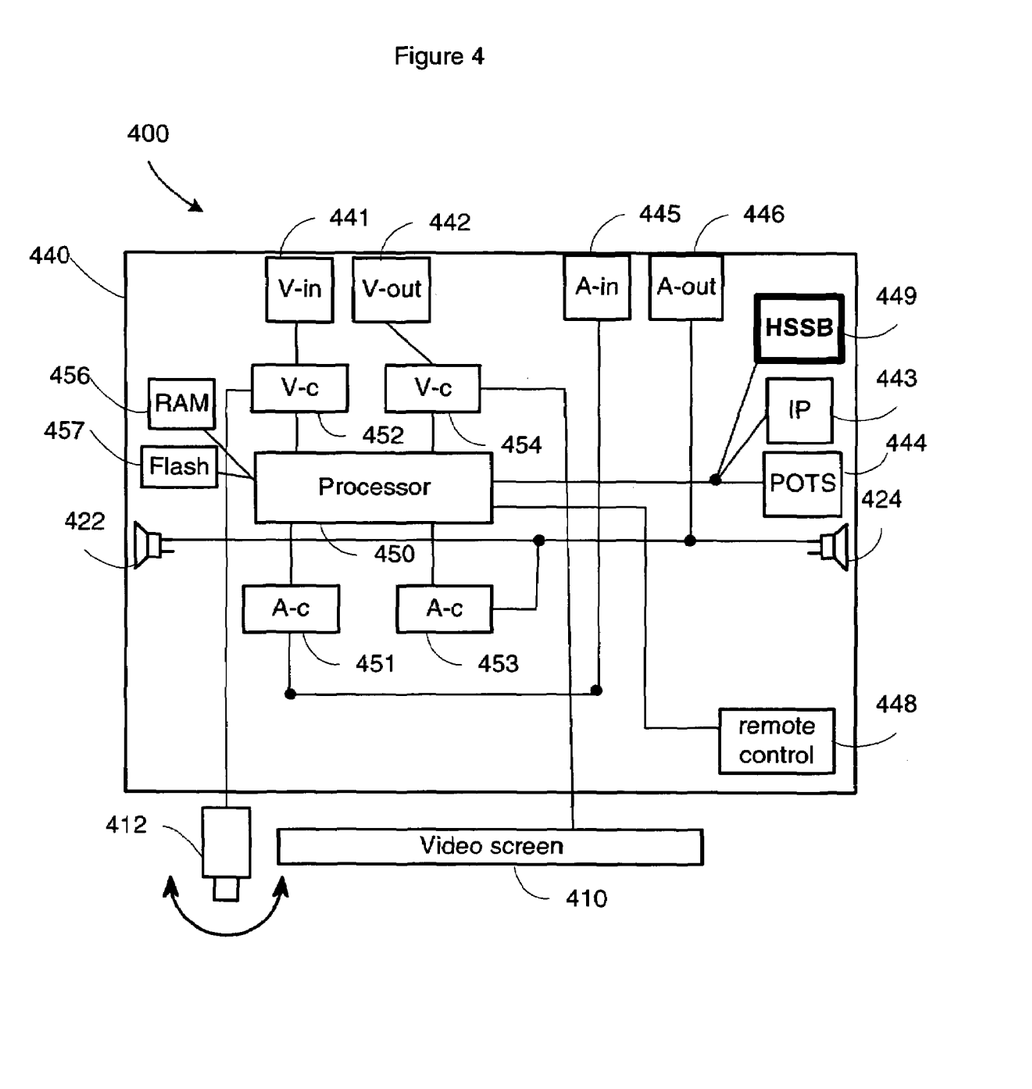
FIG. 4 depicts a block diagram of a video conferencing unit used in the system shown in FIG. 3.

FIG. 1 illustrates a typical video conferencing unit 100 with a video conferencing module 110 and a display screen 130. In this example, the video conferencing module 110 includes a video camera 102. A microphone pod 145 which contains three microphones 142, 143 and 144 is connected to the module 110. There are many other components inside the video conferencing module 110. A block diagram of a video conference module 110 according to an embodiment of the current invention is shown in FIG. 4. The video conferencing module 110 is connected to a network through cable 150. There are many wires not shown in FIG. 1 that connect the video conferencing module 110 to various networks, including telephone networks or data networks, and to a power supply. The display screen 130 may be a regular TV set or a stand alone video monitor including loudspeakers 122 and 124. Depending on the number of sites of the videoconferencing, the display screen 130 may be divided into smaller windows, such as windows 131 and 132 for showing far end sites, window 133 for showing near end site, and windows 134 and 135 for showing conference status information.

Figure 2:
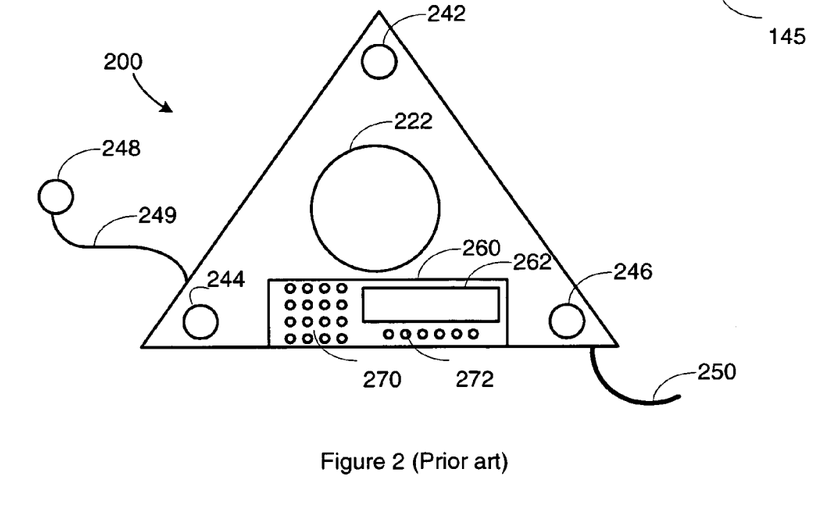
FIG. 2 depicts a speakerphone with satellite microphones in prior art.

FIG. 4 illustrates a block diagram of a video conference unit 400. The video conference unit 400 has a central module 440, which has internal loudspeakers 422 and 424, a connection to the installed camera 412 and a connection to a display screen 410. The central module 440 has many interfaces for additional video and audio components: video input interface 441, video output interface 442, audio input interface 445 and audio output interface 446. Each interface has connections to multiple audio or video channels. For example, the video input interface 441 can accept video signals from two additional video cameras. The video output interface 442 may output two video channels for up to four monitors. The audio input interface 445 may accept up to twelve microphones, which can be grouped into up to four audio channels. The audio output interface 446 may output five more audio channels. The signal processing and control is performed by the processor unit 450, which is coupled to various audio/video components or interfaces through intermediates 451, 452, 453 and 454. Those intermediates 451-454 perform signal conversions, such as DAC, ADC etc. They are shown as separate blocks, but could be integrated into a single module or an integrated chip. The processor unit 450 is supported by memory module 456 (typically RAM) and mass storage 457 (typically flash memory). Signal processing programs may be stored in the mass storage 457. Component profiles, which may be used in certain situations, can be stored there. The central module 440 has several network interfaces, one interface 443 for a digital network, one special HSSB interface 449 which will be described in more detail below, and another interface 444 for an analog network, typically for connecting with Plain Old Telephone Service (POTS) lines. The interface 444 has at least two POTS lines, one line for each audio channel when a stereo conference is used. The digital interface 443 may support various digital connections, such as ISDN, Ethernet, or USB. The ISDN connection is mainly used for a video conference connection through an ISDN network. The Ethernet or LAN connection is mainly used for video conference through the Internet or over a LAN. The USB connection may be used to exchange additional audio/video media stream, such as additional cameras, microphones, computers with additional documents etc. A remote control interface 448 is connected to the central module 440. The remote control interface 448 can receive control commands from a handheld remote control (not shown) and transmit the commands to the central module 440 to control the operation of the video conference unit 400. The HSSB interface 449 is a special interface for a conference link, according an embodiment of the current invention. In one embodiment, the HSSB interface 449 is physically similar to an Ethernet interface, using CAT5 type of cable for connection. But the HSSB interface 449 preferably uses its own link protocol for transmitting audio data and control data A typical speakerphone is shown in FIG. 2. The speakerphone 200 may contain a loudspeaker 222 and several microphones 242, 244, 246 and 248. Microphones 242, 244 and 246 are embedded in the speakerphone while microphone 248 is a satellite microphone connected to the speakerphone 200 through cable 249. The speakerphone 200 may also include a dial-pad 260 which includes a keypad 270, control buttons 272 and an LCD display 262. A user may control the functions of the speakerphone 200 through the keypad 270 and control buttons 272 and get feedback of the operation or status of the speakerphone 200 through the LCD display 262. The speakerphone 200 may be connected to a network through connection 250, which can be either a POTS network, an ISDN network, or an IP network, or some combination of them. There are many other components or connections not shown in FIG. 2, e.g. a connection to a power source, signal processor in the control module, network interface.

Figure 5:
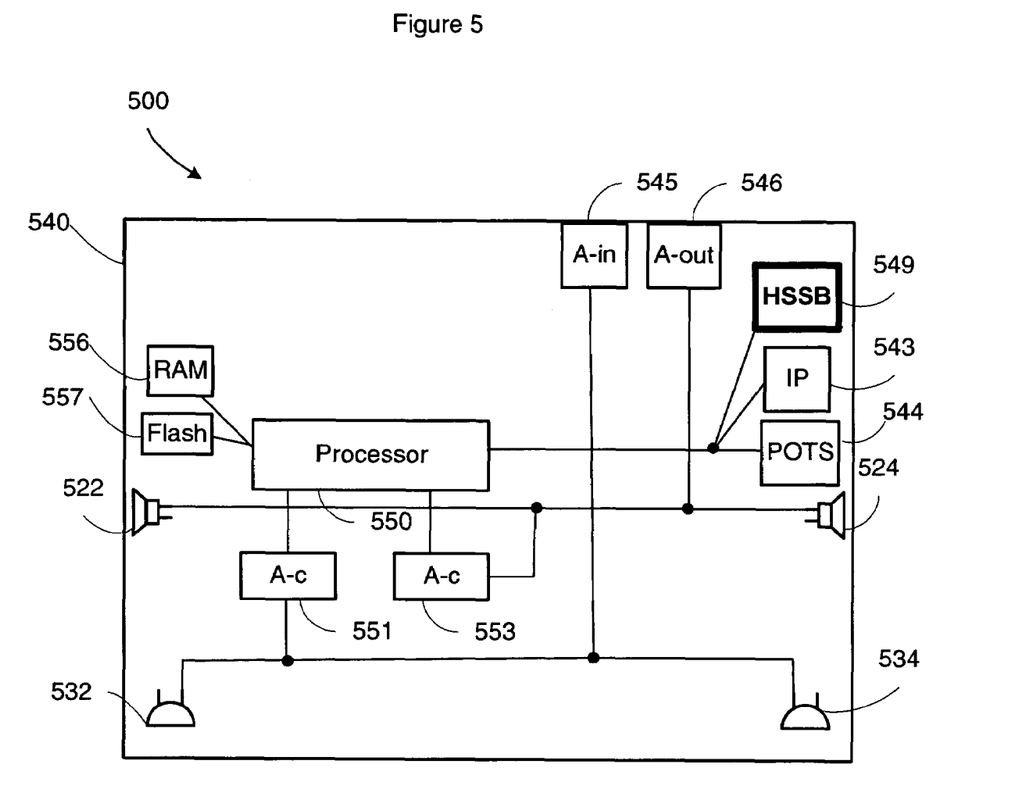
FIG. 5 depicts a block diagram of a speakerphone used in the system shown in FIG. 3.

A block diagram of a speakerphone according to an embodiment of the current invention is shown in FIG. 5. It is almost identical to a video conference unit as shown in FIG. 4, except for the omission of video related components. It has a central module 540, which has microphones 532 and 534, loudspeakers 522 and 524, signal converters 551 and 553, audio input interface 545, audio output interface 546, an HSSB interface 549, a digital network interface 543, an analog network interface 544, a memory module 556, a mass storage module 557 and a processor 550.

Analog Link

Figure 3:
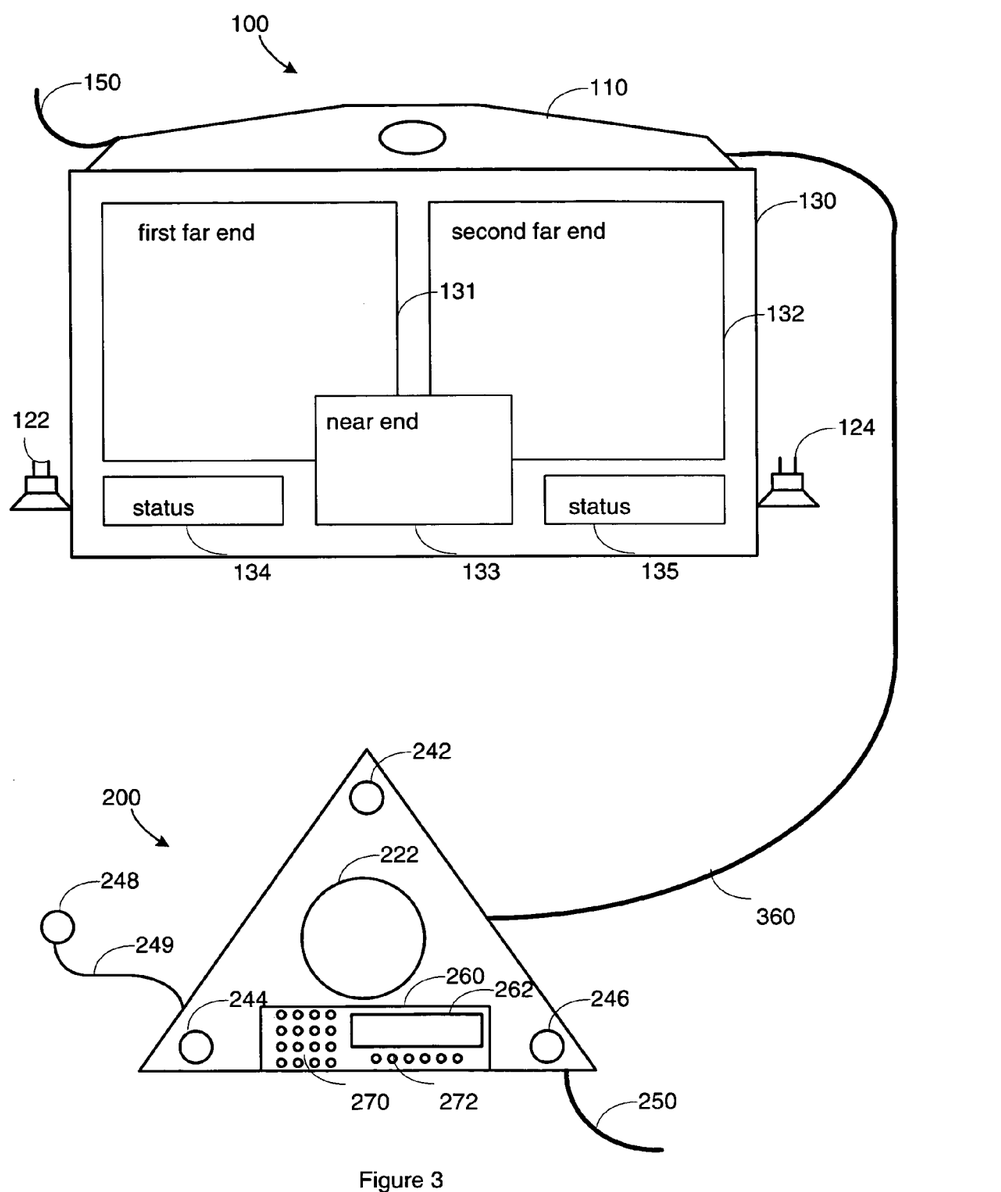
FIG. 3 illustrates a conference link between a video conference unit and a speakerphone according to an embodiment of the current invention.

As one can see from FIG. 4 and FIG. 5, there are many common components in a video conference unit and a speakerphone. According to an embodiment of the current invention as shown in FIG. 3, a video conferencing unit 100 is connected to a speakerphone 200 through a conference link 360. The conference link 360 connects the video conference unit 100 and speakerphone 200, preferably through the special HSSB interfaces. The link 360 can be implemented and used in many different ways. In one implementation, link 360 is a simple analog audio link which connects the analog microphone signals and loudspeaker signals between the video conferencing unit 100 and the speakerphone 200. With this link 360, the microphones in the speakerphone 200 pick up voices from conference participants and supply such microphone signals to the video conferencing unit 100 for further processing. At the same time, the loudspeakers in the speakerphone 200 reproduce voices from the far end. This way, the external microphones and loudspeakers for the video conference unit 100 may be eliminated from conference room. The audio processing then can be performed by the audio processor inside the speakerphone 200. The audio processing of the speakerphone 200 may have various audio features such as full duplex audio, noise reduction, acoustic echo cancellation and even stereo audio pickup and reproduction. In this embodiment, the link 360 between the video conference unit 100 and the speakerphone 200 can be very simple, for example, a three-wire cable, commonly used in cell phone headsets or stereo earphones. The three-wire cable includes one wire for loudspeaker signal, one for microphone signal and one for common ground Alternatively, if the audio components in the video conference unit 100 are retained, then the audio components in the speakerphone 200 can expand the capability of the video conferencing unit regarding the audio pickup and reproduction. The microphones and loudspeakers in the speakerphone 200 can provide wider coverage in a large conference room.

Digital Link

In another embodiment of the current invention, as shown in FIG. 3, the link 360 is a digital link between the video conference unit 100 and speakerphone 200. The digital link is called a High-Speed Serial Bus or a Conference Link. A digital cable 360 couples the video conference unit 100 and the speakerphone 200 through the HSSB interfaces 449 and 549 respectively.

When a digital connection is used, various data packets can be transmitted between the video unit 100 and the speakerphone 200. These data may include multiple channels of digitized audio data between the two units.

The data transmitted between the units are in data packets. Each packet may include several 16-bit words, typically two to eight words. Each word may represent the digitized data for one audio channel, one control command, one response or the like. In one embodiment, the digital link is implemented in a master/slave protocol, for example, a video unit is a master and all connected speakerphone are slaves. The communication between them is asymmetric.

Making Conference Calls, Master/Slave

Figure 6:
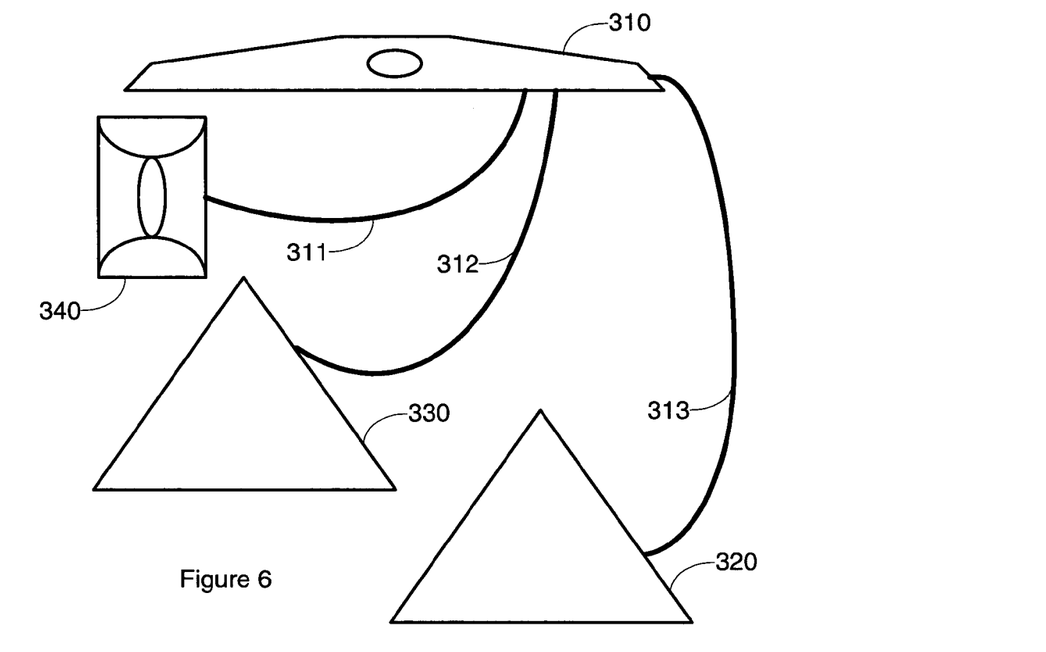
FIGS. 6 and 7 show two alternative topologies of conference links between a video conference unit, two speakerphones and a subwoofer.
Figure 7:
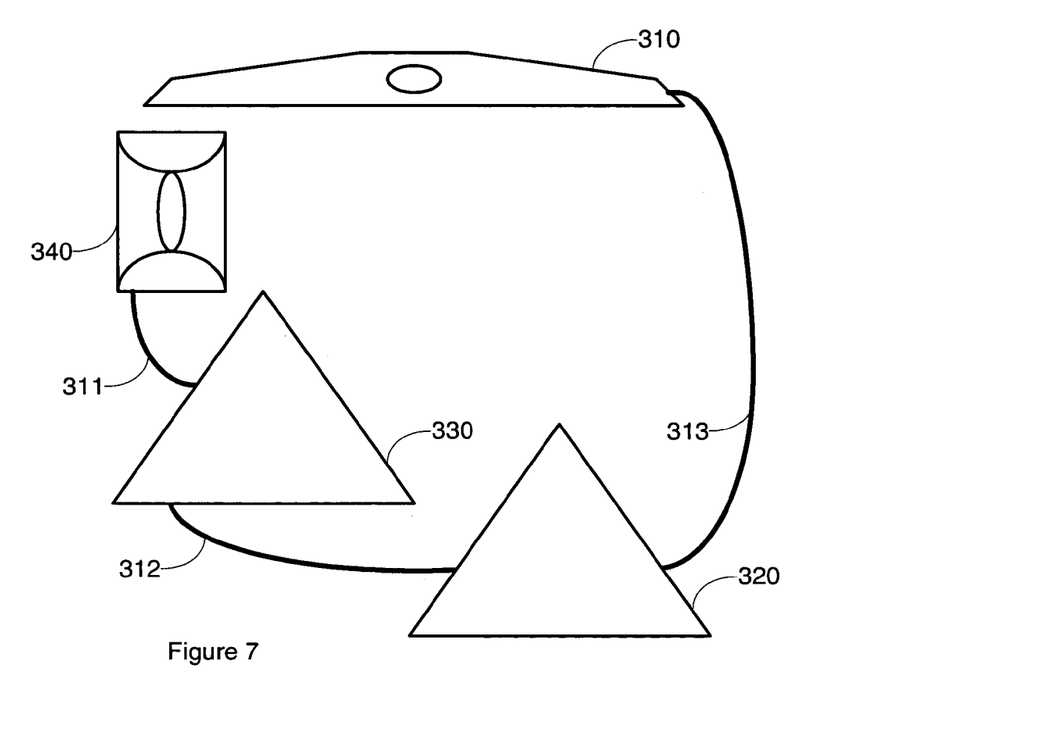

Once the connection between a video conference unit and one or more speakerphones is setup, the audio data are transmitted between them. The video unit may be a master and the audio unit may be a slave. The audio unit is collecting audio data from its internal, external and auxiliary microphones at the local conference room, possibly in many distinct audio channels. The connection can be in parallel as shown in FIG. 6, or in series as shown in FIG. 7. The video unit can send a different audio channel to a different audio unit to achieve multi-channel sound. The video unit may also segregate the bass sound from each audio channel and feed the bass sound to a subwoofer 340 as shown in FIGS. 6 and 7. The sound reproduction may also be arranged in a bandpass/crossover loudspeaker network. For such a case, each loudspeaker in the network only produces a band-limited spectrum of sound for a particular audio channel and the video unit properly segregates the desired bands for the particular loudspeakers.

The combined video conference unit and a speakerphone can be used to make various conference calls, e.g. an audio only conference call, a video conference call or a three-party mixed video and audio conference call.

When the speakerphone alone is making an audio only call, the speakerphone can be used as a normal speakerphone, except that part of the audio signal may be sent to the video unit for processing and reproduction. For example, the audio data from the far end is sent to the video unit via the conference link. The bass sound is produced in the subwoofer. The microphones in the video units are disabled.

When the video conference unit is making a video conference call, it can be used normally, except that the near end audio input is generated from the microphones in the speakerphone.

Figure 8:
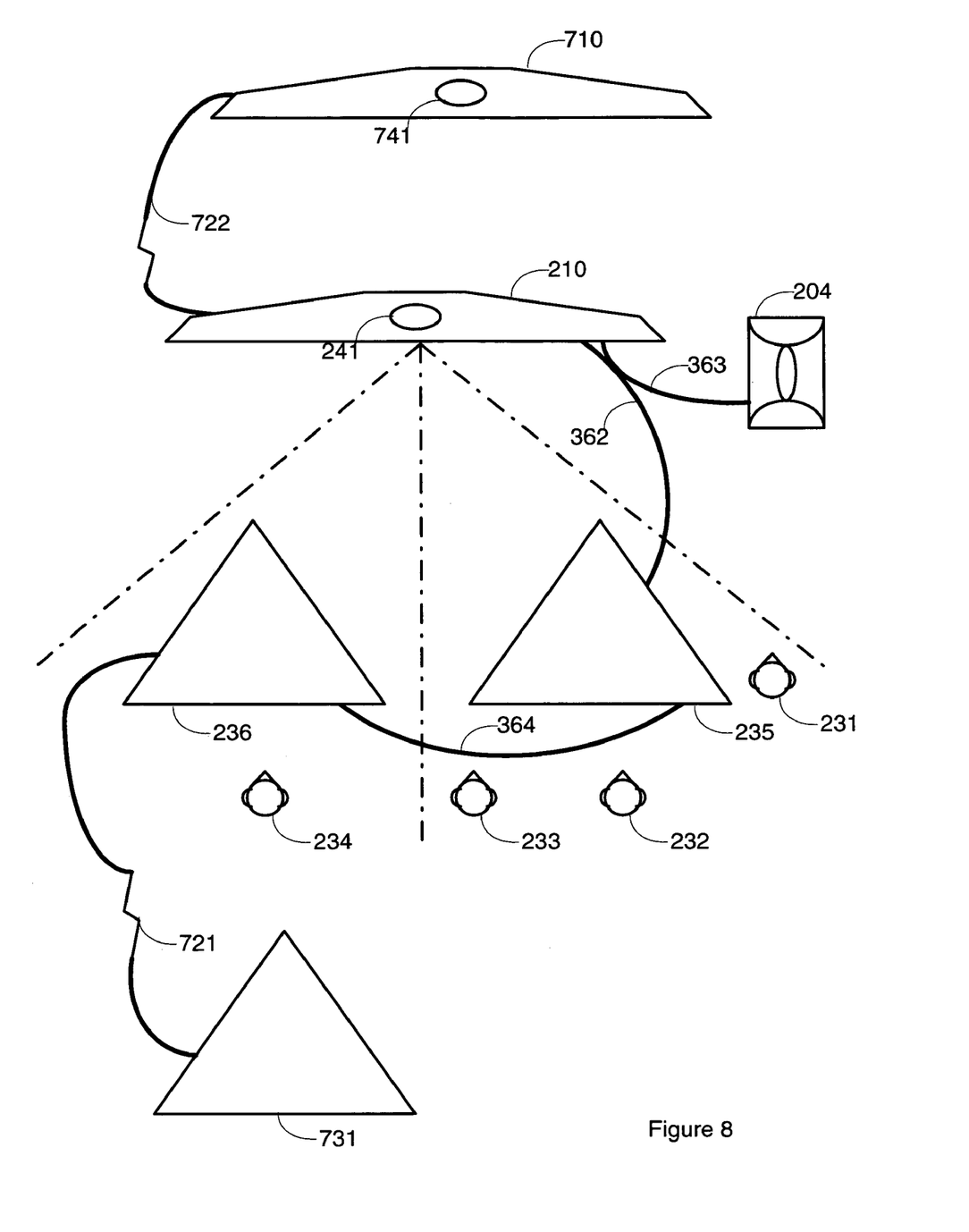
FIG. 8 shows a teleconference setup between three sites. Two of the three sites have a video conference. One of the two sites and the third site have an audio conference.

When a video conference unit and a speakerphone are both used in a three-site conference call as illustrated in FIG. 8, the conference link can provide the most benefits. As in the example shown in FIG. 8, the first far end site and the near end site have a full video conference. The near end site and the second far end site have only audio conference capability. A video connection between the near end site and the second far end is not available. People at the second far end site cannot see what is going on in the other two sites, but at least they can hear and take part in the discussion. In this situation, the video conference connection 722 is typically a wide band connection, such as a high speed IP connection or an ISDN connection. The audio conference connection 721 may be a 3 kHz narrow band connection or a 7 kHz wideband connection through a POTS network. The video unit and speakerphone combination at the near end site is acting as a bridge, interconnecting the two dissimilar networks.

Figure 9:
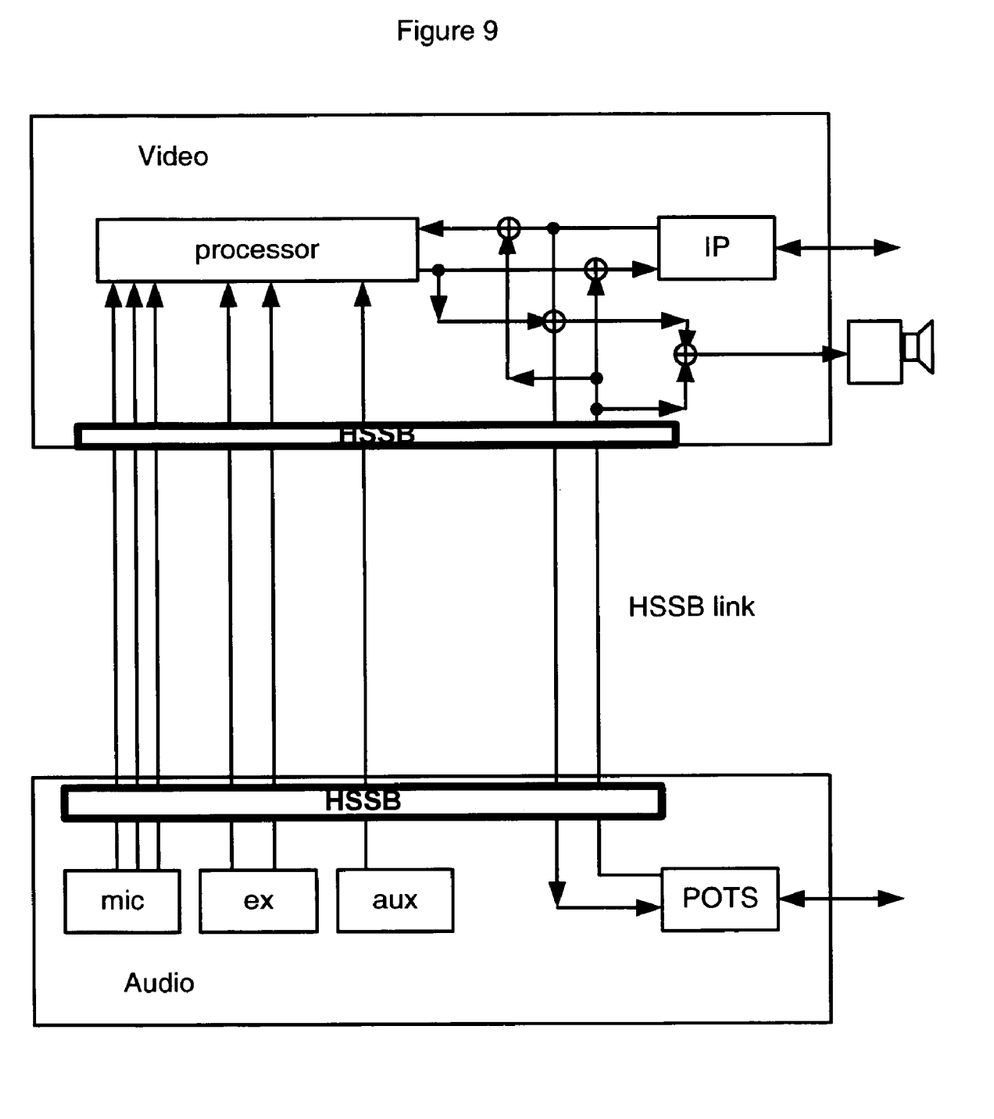
FIG. 9 shows audio data flows during a three-site conference where the video processor is processing the audio data

At the near end site, the audio portion may be processed as shown in FIG. 9. The microphones connected to the speakerphone collect audio signals in the near end conference room and send them to the video unit for further processing. The speakerphones 236 and 235 also receive audio signals from the second far end speakerphone 731 and forward that signal to the video unit 210. The video unit 210 receives audio signals from the first far end site and forwards it to the speakerphones 235 and 236 which further send the audio signals to the second far end site 731. The audio signals from all three sites are collected at the video unit 210, processed, and reproduced through the loudspeakers connected to the video unit such as 204.

In the above examples where the master/slave protocol is used, the speakerphones perform only minimum data processing. The speakerphone is used primarily as an interface to the POTS network, as external microphones and as external loudspeakers. Therefore, a "dumb" and typically cheaper speakerphone may be installed in a conference room without degrading the audio conference capability in that conference room.

Figure 10:
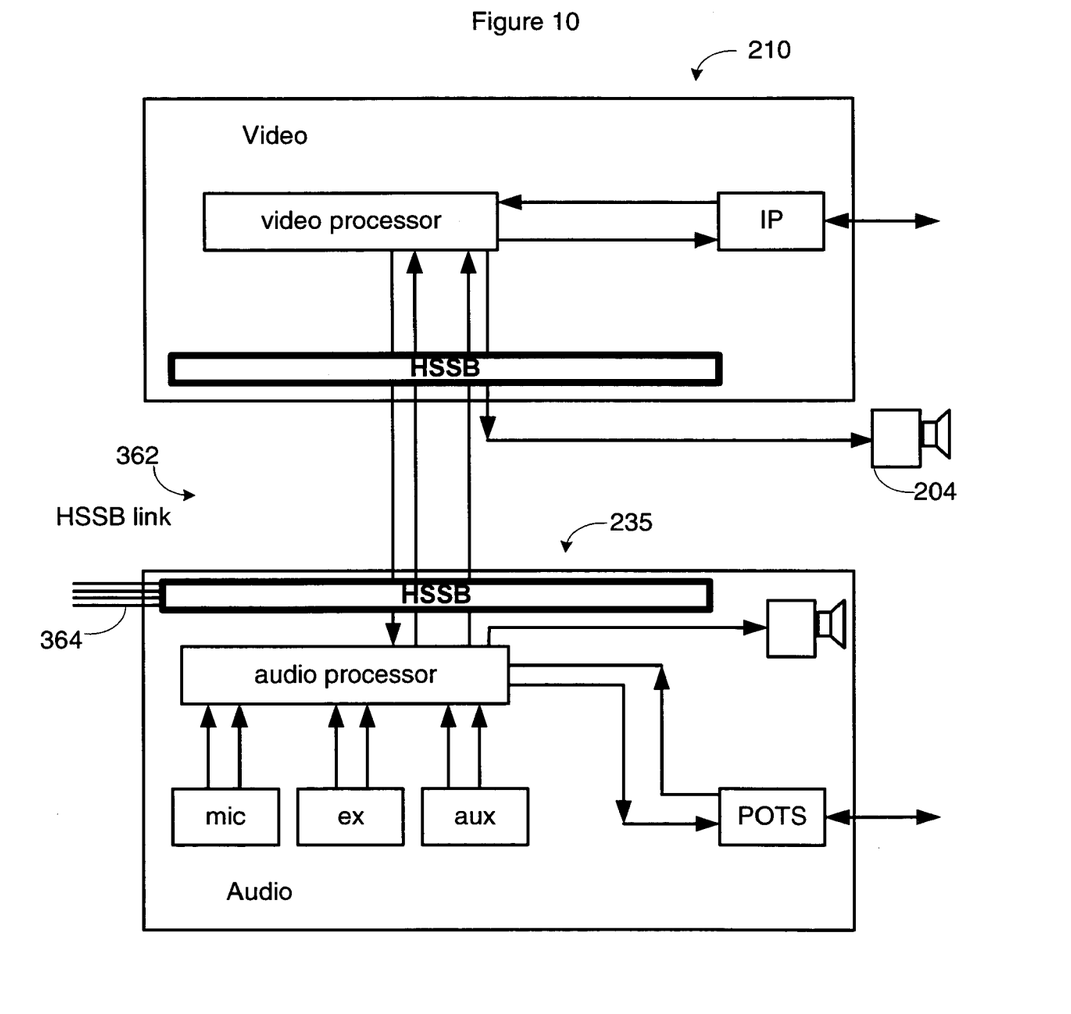
FIG. 10 shows audio data flows during a three-site conference where the audio processor is processing the audio data

Alternatively, the data processing may be distributed differently, for example, by allocating all video data processing in the video conference unit and allocating all audio data processing in the speakerphone. In this embodiment, regardless of the types of conference calls, all video data are collected and processed by the processor in the video unit; all audio data are collected from various far end sites or near end site are sent to the speakerphone and processed in the speakerphone. FIG. 10 illustrates the audio data processing at the near end site for a system shown in FIG. 8. Referring to the example shown in FIGS. 8 and 10, the video conference unit 210 receives both video data and audio data from the first far end video conference unit 710 through video conference connection 722. The video data stay in video conference unit 210 and are processed together with the video data from the local camera 210. The audio data from video conference unit 710 are sent to speakerphone 235 via conference link 362. Similarly, audio data from the second far end speakerphone 713 are sent to the speakerphone 235 through the POTS connection 721, the speakerphone 236 and the conference link 364. All audio data from the two far end sites and the local site are processed by speakerphone 235. The processed audio data are sent to the loudspeakers in speakerphones 235 and 236, and a stand-alone bass loudspeaker 204 for reproduction. These loudspeakers can reproduce sound fields with full audio spectrum coverage and a better spatial coverage in the near end site conference room. This way, the processor in the video conference unit is optimized to work with video data and the speakerphone is optimized to work with audio data.

In yet another embodiment, the data processing is allocated among various components on an as-needed/as-available basis such that processing power in either the video conference unit or the speakerphone is fully utilized and balanced. In some state of the art video conference units or speakerphones, the processors are general purpose processors and very powerful, for example the processors in the Polycom VSX7000 video conference units or VTX1000 speakerphones have up to 1000 MIPS capabilities (1 MIPS=1 Million Instructions Processed per Second). As long as an appropriate software program is loaded to a processor, either a video data processing program or an audio data processing program, the processor can perform the processing task as dictated by the program. This way, each component, the video conference unit or the speakerphone does not run out of processing power until the combined units run out of processing power. Another benefit of this embodiment is making the combined video/speakerphone very scalable, i.e. the unit's processing power can grow gradually rather than replacing the old unit with a new more powerful one every time when the demands exceed the current capacity. For example, still referring to the system shown in FIG. 8, if the video conference units 710 and 210 only have enough processing power to handle a video conference call with stereo audio between themselves, then no more conference sites can be added to the conference. Using this embodiment, adding two more speakerphones 235 and 236 will provide additional processing power to enable more audio sites or video sites to be added to the system without replacing the video conference unit 210. The processors in the speakerphones 235 and 236 may handle the additional audio or video data processing requirement due to the additional conference sites.

To simplify the process to establish a conference call, either a video conference call or an audio conference call, an auto dialing program may be installed. The auto dialing program may be installed in one of the processors in the devices linked by the conference links. It can keep track of calling information of itself and other parties. The calling information may include the POTS phone number, ISDN phone number, IP address etc. Each type of number may have a default mode of conference call, either a video call or an audio call. From its own calling information and that of the called party, the processor can determine which type of call will take place and what prefix, if any, is needed to be added in front of the dialing stream. All of the dialing information may be stored in a directory on each device. When a user wants to make a call, he can manually input the dialing information as usual, or he may select the other party from the directory list. When the user selects an entry from the directory, the dialing program determines the type of the call and the necessary prefix. For example, if both parties are internal to a same company, then only the four-digit extension 4567 is dialed, where the called party's phone number is 1-832-123-4567. The phone number includes the country code 1, area code 832, phone number 123-4567. If parties are in different countries, then appropriate country code, area code plus the access code will be added to the dialing stream. For example, when a speakerphone in Houston, Tex., USA dials a speakerphone in London, England, the dialing stream may be 9-011-44-20-1234-5678. The added prefix includes an access number 9 to reach an external telephone network and international phone call access number 011. But when the speakerphone in London dials the speakerphone in Houston, the dialing stream is 00-1-832-123-4567, where the international access number changes to 00 and no external access number is needed when the speakerphone is connected to the public telephone network directly.

Entries in a directory in a device may be entered or collected by various ways. They may be entered by a user manually, or downloaded from other speakerphones or video conference units linked by conference link, or captured during a conference call. During the process of establishing a conference call, the video conference units or speakerphones involved exchange dialing information. Such information may be stored in the directory maintained by the speakerphone or video conference units for later use.

The auto dialing program is aware of the different dialing numbers and their associated networks or protocols. When a user select an entry to establish a conference call, the auto dialing program selects a mutually supported network and protocol between the near end device and the far end device for the selected type of call. The selection of the networks or protocols is transparent to the user. In one embodiment, the available types of conference between the near end and a far end entry in the directory are indicated in the directory. So a user knows the types of conference calls available between the two parties before trying to establish a conference call. For example, a local video device may is capable of video calls through IP, ISDN or other network, but a far end only supports an ISDN video call. When a user initiates a video conference call, he can simply select the far end from the entry in the directory which may indicate that video conference capability is available at the far end. The auto dialing program selects the ISDN network and the ISDN number of the far end party to establish the video conference call. The user does not need to know the detail of what type of video call is established.

In addition to sharing components such as microphones and loudspeakers between linked speakerphones and video conference units via conference links, more functions and resources may be shared among them. For example, a directory on one device may be accessed by another device through the conference link.

The conference link may be an analog link or a digital link as described above. These examples are just some of many ways of implementing the current invention. When the audio signals are digital signals, the conference link may be a regular Ethernet link, a USB link or other packet network. The digital signal processor in the speakerphone can process the digital signals, performing D/A and A/D conversions. The processor in the videoconference unit can separate or combine the audio data with the video data. The combined digital video and audio data are exchanged through the digital network with the video conference unit on the far end. Many digital video conference protocols may be used, for example, the ITU H.32x family of recommendations that provides multimedia communication over a variety of networks. The video data and audio data under these recommendations are processed by different codecs or components. The processes are allocated to different logical components and can be easily allocated to different physical components. According to one embodiment of the current invention discussed above, the video processing is allocated to a video conference unit and the audio processing is allocated to the speakerphone. This way, more processing power in the video conference unit can be dedicated to the video processing. Alternatively, the processor in the video unit may control all the signal processing in a master/slave arrangement as discussed in the above examples.

The audio link between a speakerphone and a video conference unit can be wired as discussed above, or it can alternatively be wireless. Using a wireless connection can avoid the many problems associated with many different wires, such as limitation of the relative locations between the speakerphone and the video conferencing unit, the unsightly wires around the conference room and table, and the trip hazards for conference participants. In the example shown in FIG. 3, the connection 360 between the videoconference unit 100 and speakerphone 200 may be wireless. The satellite microphone 248 for the speakerphone 200 may also be linked wirelessly. This way, the microphones are placed around the conference room, near the conference participants, rather than close to the speakerphone or the videoconference unit. The wireless links 249 or 360 may be the traditional 900 MHz or 2.4 GHz radio frequency links. The wireless links may also be the newer digital wireless links such as Bluetooth or IEEE 802.11. The digital wireless links are preferred over the analog wireless links for newer implementations because they can be integrated with the broader digital teleconference network with fewer intermediate conversions.

As discussed above, the embodiments of the current invention combine video conference units with speakerphones to make them work together seamlessly using conference links. With conference links, various speakerphone functions or video conference functions may be allocated among the two. The embodiments of the current invention improve and expand functionalities and features of videoconference units and speakerphones or allow cost reductions in the units. In either case, certain redundant hardware, particularly microphones and loudspeakers can be eliminated.

"Audio signals" as used in the current application can be either analog signals for audio channels in a teleconference unit, or digital signals for audio channels in a digital system. "Audio data" as used in the current application refers to digitized audio signals. "Audio data" are typically used in digital signal processors.

While illustrative embodiments of the invention have been illustrated and described, it will be appreciated that various changes can be made therein without departing from the spirit and scope of the invention.

We claim:

1. A near end video conference unit for connection with a far end video conference unit which provides and receives audio and video data, the near end video conference unit further for connection to a standalone, near end speakerphone which comprises a microphone, a loudspeaker and a network connection and which is capable of performing audio-only communications over the network connection, the near end video conference unit comprising:
    a network interface for receiving audio and video data from and providing audio and video data to the far end video conference unit;
    a control module coupled to the network interface;
    a video input interface coupled to the control module for receiving video signals;
    a video output interface coupled to the control module for sending out video signals to a video display; and
    a conference link interface coupled to the control module,
    wherein the conference link interface is operable to connect to another conference link interface on the near end speakerphone through a conference link; and
    wherein the control module is operable to exchange audio data with the near end speakerphone through the conference link.

2. The near end video conference unit of claim 1,
    wherein the control module is operable,
    to transmit the first far end audio data to the near end speakerphone through the conference link, and
    to receive audio data from the near end speakerphone through the conference link.

3. The near end video conference unit of claim 1,
    wherein the control module is operable,
    to receive data from the near end speakerphone through the conference link, and
    to process the received data.

4. The near end video conference unit of claim 1, further comprising:
    an audio input interface coupled to the control module for receiving microphone signals; and
    an audio output interface coupled to the control module for sending out loudspeaker signals,
    wherein the control module is operable to disable the audio input interface and the audio output interface when the control module is exchanging audio data with the near end speakerphone via the conference link interface.

5. The near end video conference unit of claim 1,
    wherein the control module is operable to process and packetize the audio data from the near end speakerphone for provision to the far end video conference unit.

6. The near end video conference unit of claim 1,
    wherein the near end speakerphone processes the audio signals from the microphone to develop the audio data and the control module is operable to packetize the audio data from the near end speakerphone for provision to the far end video conference unit.

7. The near end video conference unit of claim 1,
    wherein the control module is operable to maintain a directory of calling information of the near end video conference unit and far end video conference units.

8. The near end video conference unit of claim 7,
    wherein the directory contains information of conference types supported by far end video conference units;
    wherein the network interface is operable to support a plurality types of conference calls; and
    wherein the control module is operable to initiate a video conference call with the first far end video conference unit using the conference type supported by both the network interface in the near end video conference unit and the first far end video conference unit.

9. The near end video conference unit of claim 7,
wherein the plurality types of conference calls includes a conference call through IP network or a conference call through ISDN.

10. The near end video conference unit of claim 7, wherein the near end speakerphone further has a directory of dialing information of itself and far end speakerphones;
wherein the control module is operable to accept the dialing information of far end speakerphones from the near end speakerphone through the conference link.

11. A near end speakerphone for connection with a far end speakerphone which provides and receives audio data, the near end speakerphone further for connection to a near end video conference unit having a network interface and which provides and receives audio and video data, the near end speakerphone comprising:
a control module;
a loudspeaker coupled to the control module;
a microphone coupled to the control module; and
a conference link interface coupled to the control module,
wherein the conference link interface is operable to connect to another conference link interface on the near end video conference unit through a conference link; and
wherein the control module is operable to exchange audio data with the near end video conference unit through the conference link.

12. The near end speakerphone of claim 11, further comprising a network interface coupled to the control module for receiving audio data from and providing audio data to the far end speakerphone.

13. The near end speakerphone of claim 12, wherein the control module is operable,
to receive far end audio signals from the far end speakerphone; and
to transmit the far end audio signals to the near end video conference unit
through the
conference link.

14. The near end speakerphone of claim 12, wherein the control module is operable,
to receive audio signals from the near end video conference unit through the conference link;
to process the audio signals from the near end video conference unit; and
to transmit the audio signals to the far end speakerphone.

15. The near end speakerphone of claim 12, wherein the control module is operable,
to receive near end audio signals from the microphone;
to process the near end audio signals to form near end audio data;
to transmit the near end audio data to the near end video conference unit through the conference link; and
to transmit the audio signals to the far end speakerphone.

16. The near end speakerphone of claim 12, wherein the control module is operable,
to receive data from the near end video conference unit through the conference link, and
to process the received data.

17. The near end speakerphone of claim 12, wherein the control module is operable to maintain a directory of calling information of the near end speakerphone and far end speakerphones.

18. The near end speakerphone of claim 17,
wherein the control module is operable to add dialing prefix to the dialing information based on the dialing information of the near end speakerphone and a far end speakerphone.

19. The near end speakerphone of claim 17, wherein the near end video conference unit further has a directory of dialing information of itself and far end video conference units;
wherein the control module is operable to accept the dialing information of far end video conference units from the near end video conference unit through the conference link.

20. The near end speakerphone of claim 12, wherein the control module is operable,
to receive far end audio signals from the far end speakerphone;
to receive audio signals from the near end video conference unit through the conference link;
to receive near end audio signals from the microphone;
to process the far end audio signals, the audio signals from video conference unit and the near end audio signals to form mixed audio data; and
to send the mixed audio data to the loudspeaker for producing sound.

21. The near end speakerphone of claim 20, wherein the mixed audio data includes at least two audio channels.

22. A teleconference system for connection with a far end video conference unit which provides and receives audio and video data, the teleconference conference system further for connection to a far end speakerphone which contains a microphone and a loudspeaker, the teleconference system comprising:
a near end video conference unit having:
a v-network interface for receiving audio and video data from and providing audio and video data to the far end video conference unit;
a v-conference link interface; and
a v-control module coupled to the v-network interface and the v-conference link interface;
a near end speakerphone having:
a microphone;
a loudspeaker;
an s-network interface for receiving audio data from and providing audio data to the far end speakerphone;
an s-conference link interface; and
an s-control module coupled to the s-network interface, the s-conference link interface, the microphone and the loudspeaker; and
a conference link connecting the v-conference link interface with the s-conference link interface,
wherein the conference link couples the v-control module to the s-control module; and
wherein audio signals are transmitted between the near end video conference unit and the near end speakerphone through the conference link.

23. The teleconference system of claim 22,
wherein the v-control module is operable,
to transmit the far end audio data to the near end speakerphone through the conference link, and
to receive audio data from the near end speakerphone through the conference link.

24. The teleconference system of claim 22,
wherein the near end conference unit further having,
a v-audio input interface coupled to the v-control module for receiving microphone signals; and a v-audio output interface coupled to the v-control module for sending out loudspeaker signals, and wherein the v-control module is operable to disable the v-audio input interface and the v-audio output interface when the v-control module is exchanging audio data with the s-control module through the conference link.

25. The teleconference system of claim 22, wherein the v-control module is operable to process and packetize the audio data from the near end speakerphone for provision to the far end video conference unit.

26. The teleconference system of claim 22, wherein the s-control module is operable, to receive far end audio signals from the far end speakerphone; and to transmit the far end audio signals to the near end video conference unit through the conference link.

27. The teleconference system of claim 22, wherein the s-control module is operable, to receive audio signals from the near end video conference unit through the conference link;

to process the audio signals from the near end video conference unit; and to transmit the audio signals to the far end speakerphone.

28. The teleconference system of claim 22, wherein the s-control module is operable, to receive near end audio signals from the microphone;

to process the near end audio signals to form near end audio data;

to transmit the near end audio data to the video conference unit through the conference link; and to transmit the audio signals to the far end speakerphone.

29. The teleconference system of claim 22, wherein the s-control module is operable, to receive far end audio signals from the far end speakerphone through the s-network interface;

to receive audio signals from the near end video conference unit through the conference link;

to receive near end audio signals from the s-audio input interface;

to process the far end audio signals, the audio signals from the near end video conference unit and the near end audio signals to form mixed audio data; and to send the mixed audio data to the loudspeaker for producing sound.

30. The teleconference system of claim 29, wherein the mixed audio data includes at least two audio channels.

31. The teleconference system of claim 22, wherein the conference link is a wired link.

32. The teleconference system of claim 31, wherein the wired link is a three-wire link, with one wire for microphone signal, one wire for loudspeaker signal and one wire for common ground.

33. The teleconference system of claim 31, wherein the wired link is an Ethernet link.

34. The teleconference system of claim 31, wherein the wired link is a USB link.

35. The teleconference system of claim 22, wherein the link is a wireless link.

36. The teleconference system of claim 35, wherein the wireless link is a 2.4 GHz radio link.

37. The teleconference system of claim 35, wherein the wireless link is a Bluetooth link.

38. The teleconference system of claim 35, wherein the wireless link is an IEEE 802.11 compatible link.

39. The teleconference system of claim 22, wherein the link is an analog link.

40. The teleconference system of claim 22, wherein the link is a digital link.

41. The teleconference system of claim 22, wherein the v-control module is operable to transmit all audio signals via the conference link to the s-control module; and wherein the s-control module is operable to process the audio signals.

42. The teleconference system of claim 22, wherein the s-control module is operable to transmit all audio signals via the conference link to the v-control module; and wherein the v-control module is operable to process the audio signals.

43. The teleconference system of claim 22, wherein the v-control module is operable to transmit data via the conference link to the s-control module; and wherein the s-control module is operable to process the transmitted data.

44. The teleconference system of claim 22, wherein the s-control module is operable to transmit data via the conference link to the v-control module; and wherein the v-control module is operable to process the transmitted data.

45. The teleconference system of claim 22, further comprising, one or more speakerphones having second s-control modules coupled to the s-control module or the v-control module via one or more second conference links, wherein one of the second s-control modules is operable to receive audio signals via a second conference link, and wherein the second s-control module is operable to process the audio signals.

46. The teleconference system of claim 45, wherein the second conference links and the conference link couple speakerphones and the video conference unit in series.

47. The teleconference system of claim 45, wherein the second conference links and the conference link couple speakerphones and the video conference unit in parallel.

48. The teleconference system of claim 22, wherein the v-control module is operable to maintain a v-directory of calling information of the near end video conference unit and far end video conference units.

49. The teleconference system of claim 48, wherein the v-directory contains information of conference types supported by far end video conference units;

wherein the v-network interface is operable to support a plurality types of conference calls; and wherein the v-control module is operable to initiate a video conference call with the first far end video conference unit using the conference type supported by both the v-network interface in the near end video conference unit and the first far end video conference unit.

50. The teleconference system of claim 48, wherein the v-control module is operable to accept the dialing information of far end speakerphones from the near end speakerphone through the conference link; and wherein the v-directory contains calling information of far end speakerphones.

51. The teleconference system of claim 22,
wherein the s-control module is operable to maintain an s-directory of calling information of the near end speakerphone and far end speakerphones.

52. The teleconference system of claim 51,
wherein the s-control module is operable to add dialing prefix to the dialing information based on the dialing information of the near end speakerphone and a far end speakerphone.

53. The teleconference system of claim 51,
wherein the s-control module is operable to accept the dialing information of far end video conference units from the near end video conference units through the conference link; and
wherein the s-directory contains calling information of far end video conference units.

54. A teleconference system comprising:
a near end conference system having:
   a near end video conference unit; and
   a near end speakerphone coupled to the near end video conference unit via a conference link,
      wherein the near end speakerphone has a microphone and a loudspeaker;
a first far end conference system having a far end video conference unit coupled to the near end video conference unit through a first network, wherein the first far end conference system is operable to provide first far end video and audio signals; and
a second far end conference system having a far end speakerphone coupled to the near end speakerphone through a second network, wherein the second far end conference system is operable to provide second far end audio signals,
wherein first far end audio signals from the first far end conference system are received by the near end video conference unit and transmitted to the near end speakerphone through the conference link;
wherein second far end audio signals from the second far end conference system are received by the near end speakerphone; and
wherein near end audio signals are generated by the microphone of the near end speakerphone.

55. The teleconference system of claim 54,
wherein the first far end audio signals, the second far end audio signals and near end audio signals are processed by the near end speakerphone at the near end site.

56. The teleconference system of claim 54,
wherein the second far end audio signals and the near end audio signals are transmitted to the near end video conference unit through the conference link; and
wherein the first far end audio signals, the second far end audio signals and near end audio signals are processed by the near end video conference unit at the near end site.

* * * * *